United States Patent [19]

Cafarelli

[11] 4,163,540

[45] Aug. 7, 1979

[54] EJECTION OF MOLDED MATERIALS

[76] Inventor: Ralph J. Cafarelli, 228 Stone St., Clinton, Mass. 01510

[21] Appl. No.: 804,558

[22] Filed: Jun. 8, 1977

[51] Int. Cl.² ............................ B29C 7/00; B29F 1/14
[52] U.S. Cl. ...................................... 249/67; 425/444; 425/556
[58] Field of Search .............. 425/444, 547, 564, 566, 425/550, 152, 154, 218, 806, 422, 258, 556, 577, 137, 140, 408, 437, 438, 231, 351, 436 R, 436 RM, 554, 156, 166, 151; 249/67, 68, 66, 66 C, 66 A

[56] References Cited

U.S. PATENT DOCUMENTS

| | | | |
|---|---|---|---|
| 2,253,651 | 8/1941 | Ring | 425/444 X |
| 2,675,583 | 4/1954 | Scherry | 425/422 X |
| 2,739,349 | 3/1956 | Strauss | 425/156 Y |
| 3,081,486 | 3/1963 | Skvorc | 425/151 |
| 3,642,417 | 2/1972 | Von Holdt | 425/444 X |

*Primary Examiner*—J. Howard Flint, Jr.
*Attorney, Agent, or Firm*—George E. Kersey

[57] ABSTRACT

Method and apparatus for the ejection of molded materials using a deflector that acts between the face of a mold and a structure being molded by applying angular thrust to the molded structure to free it completely from the mold.

14 Claims, 7 Drawing Figures

EJECTION OF MOLDED MATERIALS

BACKGROUND OF THE INVENTION

This invention relates to the ejection of materials from a mold, and, more particularly, to the completion of ejection of molded structures at the end of the molding cycle.

In the molding of structures, for example by injection molding, thermoplastic material is forced into patterned recesses of a separable mold. After the material has been injected into the recesses, the sections of the mold are separated and ejector pins are operated in an attempt to force the molded structure from the recesses of the mold. In high speed molding operations, the ejector pins are not always successful in freeing the structure from the mold.

Accordingly, to assure the complete ejection of molded structures, it is a common practice to employ a device such as a mold wiper, which is synchronized with the operation of the machine and assists the ejector pins by "wiping" the structure from the mold at the end of each molding cycle. The typical mold wiper is mounted at the top of one of the sections and includes a plate that is moved downwardly when the mold separates. Since the downward motion is generally inadequate to complete the ejection, the plate is also propelled forwardly.

Conventional devices for the wiping of molds are complex and intricate. The use of a downwardly moving plate adds significant bulk. In addition the need for forward motion, once the plate is in position, adds an extra dimension of complexity to the machine.

Because of the intricacy, complexity and cost of mold wiping equipment, the completion of mold ejection in many installations take place manually with the operator reaching into the opening between mold portions. This is, of course, objectionable because of the hazards presented to the operator.

Accordingly, it is an object of the invention to facilitate the separation of molded structures from mold cavities at the end of each molding cycle. A related object is to simplify the separation of structures from mold cavities.

Another object of the invention is to avoid the need for complex and cumbersome wiping machinery in order to separate molded structures from mold cavities. A related object is to eliminate the need for separate downward and forward motions of the wiper in order to bring about the desired completion of mold ejection.

A further object of the invention is to achieve the completion of mold ejection without requiring manual intervention while not significantly adding to the complexity of the molding operation.

SUMMARY OF THE INVENTION

To accomplish the foregoing and related objects, the invention makes use of one or more ejector members that enter the mold and are deflectable against the structure being molded to eject it from the mold. In particular ejector members are movable downwardly into the mold and are deflectable away from the face of the mold against the molded structure, without need for any auxiliary motive force.

In accordance with one aspect of the invention, the deflection is achieved by using a deflector finger with an opening that is contoured to act upon an associated ejector member when it reaches a prescribed depth in the mold. In particular the deflectable ejector member is a flexible rod that is proportioned and positioned to pass into the deflector opening and yet be out of contact with the contour of the opening until the prescribed depth has been reached. At that point deflection is achieved by the contact of a portion of the deflector, e.g., a special protuberance of oval or conical configuration, with the contour of the deflector opening. This causes the tip of the ejector rod on the ejector to depart from its initial downward path and provide an angular deflection, which is imparted to the molded structure to assure its final ejection from the mold.

In accordance with another aspect of the invention, the deflector fingers are adjustable to control the angle of deflection of the ejector rods with respect to the mold face. As a result the operator is able to provide a suitable ejection motion to each part regardless of its structure and configuration.

In accordance with a further aspect of the invention, the position at which deflection takes place is controllable by changing the position of the protuberance on the ejector rod, or by changing the level of the associated deflector finger, while the nature of deflection is controlled by changing the contour of the deflector and its lateral position.

In accordance with a still further aspect of the invention, the opening in the deflector has an elliptical contour which may form a partial or complete ellipse, and the protuberance on the ejector rod is desirably conical. It is advantageous for the opening in the deflector plate to have a closed contour in order to provide side support and stablize the motion of the ejector rod.

In accordance with yet another aspect of the invention, each ejector rod is of a flexible synthetic resin, such as nylon, polypropylene, or polyethylene.

DESCRIPTION OF THE DRAWING

Other aspects of the invention will become apparent after considering several illustrative embodiments taken in conjunction with the drawings in which.

DETAILED DESCRIPTION

Figure 1:
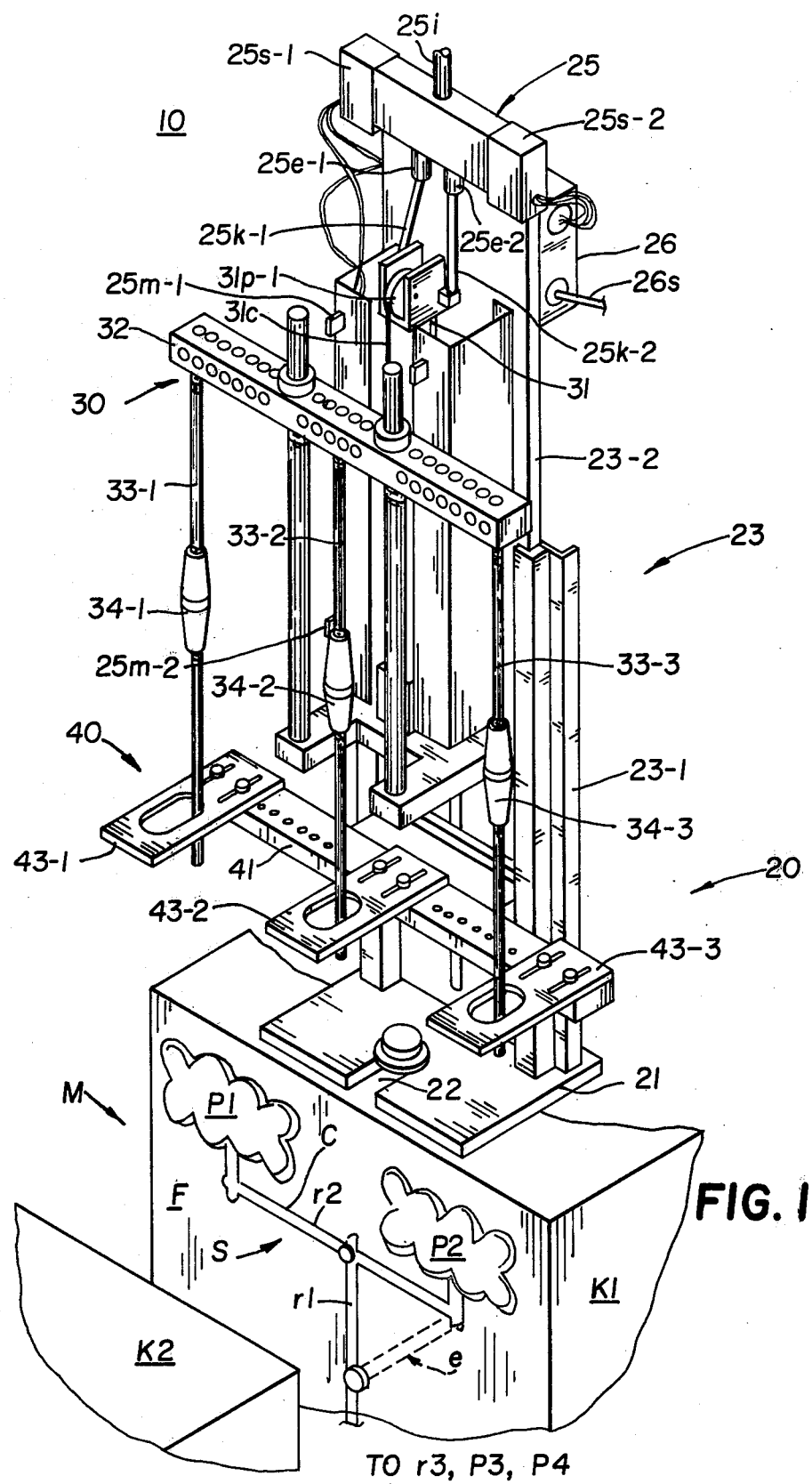
FIG. 1 is a perspective view of an ejector mechanism in accordance with the invention in position on a mold preparatory to being operated.

Turning to the drawings, FIG. 1 shows an ejector mechanism 10 in accordance with the invention, mounted on a section K1 of a separable mold M. The mold M has a second section K2 which is shown separated from the section K1.

In operation of the mold M the sections K1 and K2 are initially together and plastic material is fed into the mold cavity C along a sprue channel e. The cavity C includes various depressions for the parts to be molded and for runner channels by which the plastic material is fed from the sprue channel to the parts cavities. In the illustrative mold M of FIG. 1 provision has been made for the molding of four parts P1 through P4 of generally cylindrical configuration along runner channels r1, r2 and r3. The sprue channel e is at the output, for example, of the injector by which the plastic material is caused to enter the mold.

The entire structure S formed in the mold by the parts P1 through P4 and the connecting runners r1 through r3 is ejected from the mold M at the completion of the molding cycle as a complete unit. For that purpose the mold section K1 includes internal ejector pins (not visible in FIG. 1) which move forwardly against various positions of the structure S at the completion of each molding cycle. The purpose of the pins is to free the structure S from the cavity C at the end of each cycle, causing it to drop (by gravity) from the separated sections K1 and K2 of the mold M. However, the action of the ejector pins is frequently insufficient to bring about complete ejection of the structure S from the mold cavity. As a result it has been necessary to devise special techniques to complete the ejection, for example having the operator use an implement such as a brush to knock the mold structure S from the cavity C. In some uses operators have resorted to the dangerous practice of reaching in manually to free the structure S.

It is apparent that operator intervention to clear the mold cavity is both dangerous and time consuming. In addition, the use of special machinery for the completion of mold ejection has heretofore resulted in complex and inefficient operation by requiring reductions in operating cycle time.

The invention solves the foregoing difficulties using the ejector mechanism 10 which is formed by a frame 20, an ejector 30 and a deflector 40.

The frame 20 has a pedestal 21 by which the mechanism 10 is positioned on the mold section K1. For stability of the mechanism 10 the pedestal 21 has a frontal recess 22 to permit the mechanism 10 to be bolted to the mold section K1. Extending upwardly from the pedestal 21 is a columnar support 23 which desirably has two telescoping sections 23-1 and 23-2. The second section 23-2 has mounted on it the ejector 30 which includes a cable cylinder 31 and an ejector support cross bar 32. Suspended from the support bar 32 are individual ejector rods 33-1, 33-2 and 33-3 with respective deflectional nodules 34-1 through 34-3. Near the base of the first section 23-1 is a deflector 40 formed by a support cross bar 41 and deflector fingers 43-1, 43-2 and 43-3 for the respective rods 33-1 through 33-3.

Figure 2:
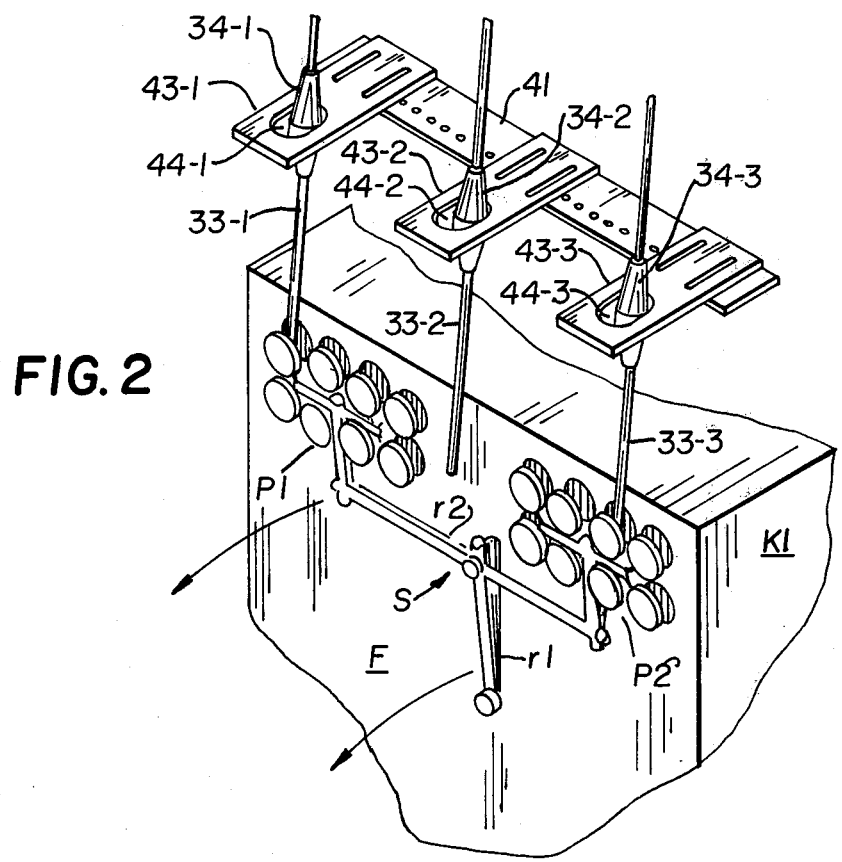
FIG. 2 is a partial perspective view of the ejector of FIG. 1 in operation.

In operation of the ejector mechanism 10 the cross bar 32 with the rods 33-1 through 33-3 is first lowered and then raised by the cable cylinder 31 at the completion of the molding cycle while the sections K1 and K2 are separated. The lowering of the cross bar causes the associated ejector rods 33-1 through 33-3 to descend vertically into the mold M along a linear path between the face F of the mold section K1 and the structure S until the nodules 34-1 through 34-3 encounter apertures 44-1 through 44-3 of the deflector fingers 43-1 through 43-3, whereupon the rods are caused to be deflected from their original path against the structure S as indicated in FIG. 2.

For that purpose the ejector mechanism is positioned on the mold section K1 in such a way that the tips 33t of the ejector fingers 33-1 through 33-3 enter the region between the face F of the mold section K1 and the structure S. Where there are ejector pins in the mold section K1, they tend to force the structure S from the mold after the sections K1 and K2 have been separated. This provides an opening for the entry of the ejector rods 33-1 through 33-3 and their subsequent deflection against the structure S to complete its dislodgment from the cavity C.

It will be appreciated that even when no ejector pins are included in the mold section K1, the ejector rods can be used for mold ejection, for example, by inclusion of channels (not shown) in the mold face to allow the rods 33-1 through 33-3 to be positioned behind the structure S and thus bring about the desired ejection.

In addition, in some forms of mold design the separation of the mold sections tends to loosen the structure S with respect to its cavity C and thus facilitate the entry of the ejector rods 33-1 through 33-3 behind the molded structure S.

Once the structure S has been ejected and collected the parts P1 through P4 are separated from the runner sections r1 through r3. This can be accomplished, for example, using the plastic injection molding system of U.S. Pat. No. 3,663,142, issued May 16, 1972.

The ejector mechanism 10 of FIGS. 1 and 2 overcomes the problem of mold ejection hangup without any increase in molding cycle time. The ejector mechanism 10 is easily mounted on top of the ejection half K1 of the mold M and is operated in synchronism with the opening of the mold M.

Figures 3A, 3B:
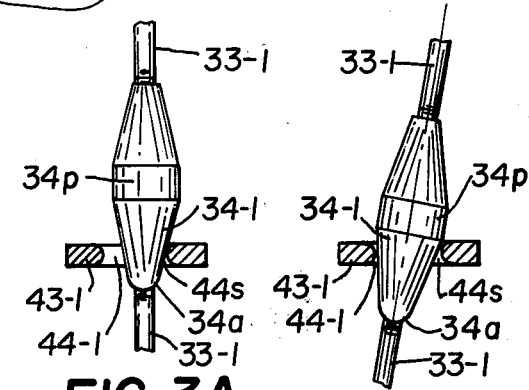
FIG. 3A is a side sectional view showing a rod of the ejector mechanism of FIGS. 1 and 2 just prior to being deflected by a deflector finger.
FIG. 3B is a partial sectional view showing the ejector rod of FIG. 3A in its deflected position.

Details of the operation and deflection of an illustrative ejector rod 33-1 are illustrated in FIGS. 3A and 3B. The rod 33-1 includes a parabolic cam nodule 34-1, with the parabolic axis 34p centered on the rod 33-1 and its apex 34a pointing downwardly towards the mold. When the rod 33-1 reaches the deflector finger 43-1 it engages a beveled surface 44s of an elliptical aperture 44-1. Further movement of the ejector rod 33-1 as shown in FIG. 3B produces the desired deflection by engagement of the parabolic nodule 34-1 with the beveled surface 44s of the aperture 44-1. In effect, the ejector rod 33-1 passes vertically through the elliptical aperture 44-1 of the finger 43-1 until the parabolic cam 34-1 contacts the beveled wall 44s, causing the rod 33-1 to have a horizontal kick imparted to aid the desired ejection of the structure S. As a result both a horizontal and a vertical thrust is provided from a single pneumatically powered cable cylinder 31 (FIG. 1).

Also indicated in FIGS. 3A and 3B is a set screw 34s to allow the parabolic nodule 34-1 to be adjustably positioned on the ejector rod 33-1. It will be apparent that the nodule 34-1 can take a wide variety of other forms to provide the desired camming action with respect to the aperture 44-1 of the finger 43-1.

Figure 4:
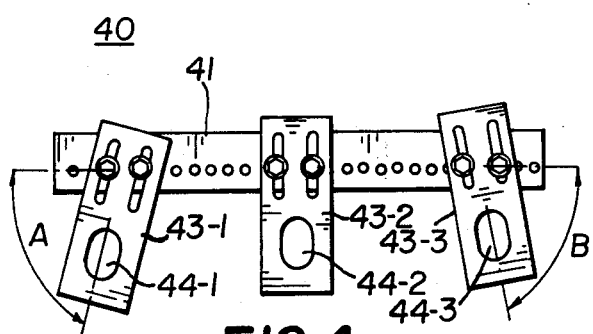
FIG. 4 is a plan view showing alternative positions for the deflector fingers of FIGS. 1 and 2 to achieve particular deflections in accordance with the characteristics of structure to be deflected.

In addition, as indicated in FIG. 4, the fingers 43-1 through 43-3 can have a variety of angular positions with respect to their supporting cross bar 41. Thus, the first finger 43-1 of FIG. 4 has been adjusted in a clockwise direction to form an angle A with respect to the axis of the bar 41. The middle finger 43-2 is retained in its original orthogonal position shown in FIG. 1, but the third finger 43-3 has been angularly adjusted in a counterclockwise direction to produce an angle B with respect to the axis of the bar 41. The angular adjustment of the fingers 43-1 through 43-3 controls the angle of deflection of the associated rods 33-1 through 33-3 in accordance with the characteristics of the mold structure S.

Figure 5A:
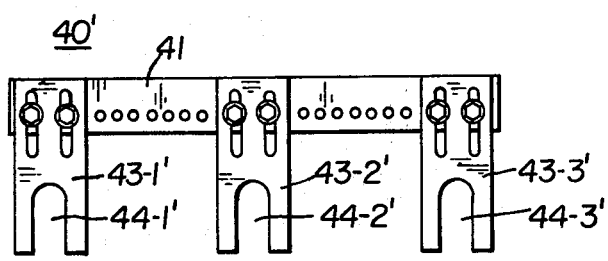
FIG. 5A is a plan view of an alternative set of deflector fingers in accordance with the invention.
Figure 5B:
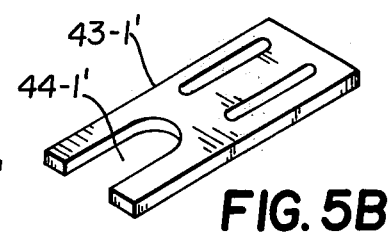
FIG. 5B is a perspective view of one of the deflector fingers of FIG. 5A.

Moreover as indicated in FIG. 5 the fingers 43-1 through 43-3 need not have closed apertures, although such apertures impart additional stability to the deflection action. In particular the fingers 43-1' through 43-3' of FIG. 5A have open contours 44-1' through 44-3', which are illustrated in detail for the finger 43-1' in the perspective view of FIG. 5B. It will be understood that the form of contour and the extent of closure may be controlled according to the nature of the desired deflection.

Returning to the overall structure 10 of FIG. 1, the ejector cross arm 32 can have a set of apertures to permit the ejector rods 33-1 through 33-3 to be moved to various positions. Similarly a set of apertures can be used to adjust the positions of the fingers 43-1 through 43-3 according to the changes made in the positions of the corresponding deflector rods.

In addition, to control the position where deflection takes place, the entire deflector 40 can be raised or lowered with respect to the pedestal 21. For that purpose the lower portion 23-1 of the support 23 can include an elliptical slot with a locking knob that allows the cross arm 41 to be raised and lowered to a desired level. Similarly, the telescoping upper portion 23-2 of the support 23 can be raised or lowered with respect to the base 23-1 and held at the desired level using, for example, a detent locking fastener.

Once the components of the mechanism 10 have been adjusted as desired, control over the movement of the ejector 30 is by way of the cable cylinder 31. The cylinder 31 has an internal piston connected at opposite ends to a cable 31c which emerges from the cylinder and over upper and lower pulleys 31p-1 and 31p-2 and is connected to the cross arm 32.

The cable cylinder is operated pneumatically from a control valve 25 of conventional construction. The valve 25 has an inlet port 25i for a suitable operating fluid, such as air, and exit ports 25e-1 and 25e-2 which transmit the air pressure to the cylinder 31 under the control of solenoids 25s-1 and 25s-2 acting in conjunction with microswitches 25m-1 and 25m-2. The upper position microswitch 25m-1 is actuated by the ejector cross bar 32 in its upper position and acts on the solenoid 25s-1. When air pressure is then applied at the inlet port 25i, it is transmitted to the cylinder 31 through the line 25k-1, causing the piston within the cylinder to be driven upwardly, as the ejector 30 descends. Conversely, when the ejector bar 32 reaches a prescribed lower position, the second microswitch 25m-2 is contacted to activate the second solenoid 25s-2 so that when air pressure is subsequently applied it is transmitted to the line 25k-2 causing the ejector 30 to be elevated. The solenoids 25s-1 and 25s-2 are operated from a junction box 26 which is energized from an ordinary electrical power source over a lead 26s. In effect, the solenoids 25s-1 and 25s-2 switch the inlet 25i to the exit ports 25e-1 and 25e-2 according to whether the ejector cross bar 32 is in its upward or downward position, e.g. with the rods 33-1 through 33-3 retracted from the mold or deflected within it.

The ejector rods 33-1 through 33-3 and their associated nodules 34-1 through 34-3 are desirably of a resinous plastic material, such as nylon. This has the advantage of preventing any damage to the mold because of the rod plasticity and facilitates the desired pivoting of the ejector rods.

In a tested embodiment of the invention, the cable cylinder 31 had a 1" bore and a 10" stroke, sold under the name and mark "Tol-O-Matic", while the valve 25 for controlling the cable cylinder was sold under the name and mark "Mac" Model 821-111B-15 with a pressure rating of 20 to 150 psi.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. Apparatus for deflecting a molded structure from a molding machine comprising
    a mold with separable parts within the machine,
    a movable member mounted on the machine,
    a flexible rod secured to said movable member for entering the space between the molded structure and one of said parts when the parts are separated,
    said flexible rod including a protuberance having an inwardly and downwardly sloping surface at an intermediate position between the ends of said rod,
    and deflection means having a cam surface for engaging the inwardly and downwardly sloping surface of said protuberance during a limited portion of the stroke of said flexible rod to thereby deflect said rod and kick said molded structure from said mold.

2. Apparatus as defined in claim 1 wherein said protuberance surrounds said rod and engages said cam only after the portion of said rod extending from said protuberance to a free end of the rod has cleared said cam.

3. Apparatus as defined in claim 2 wherein said deflection means extends at a right angle with respect to said rod before the deflection thereof.

4. Apparatus as defined in claim 1 wherein a plurality of flexible rods are secured to said movable member.

5. Apparatus as defined in claim 4 wherein a separate deflection member is included for each separate rod.

6. Apparatus as defined in claim 1 wherein said flexible rod is made of nylon.

7. Apparatus as defined in claim 1 wherein said protuberance has a parabolic cross section centered on said rod, with the apex of said parabola pointing downwardly.

8. Apparatus as defined in claim 1 wherein said protuberance has a downwardly pointing conical configuration with a longitudinal axis on said rod.

9. Apparatus as defined in claim 1 wherein said cam surface is provided by a contoured aperture which engages said protuberance to provide deflection of said rod.

10. Apparatus as defined in claim 9 wherein said aperture has an open contour.

11. Apparatus as defined in claim 9 wherein said aperture has a closed contour.

12. Apparatus as defined in claim 1 wherein the position of said flexible rod on said movable member is adjustable.

13. Apparatus as defined in claim 1 wherein the position of the protuberance on said rod is adjustable.

14. Apparatus as defined in claim 1 wherein the position of said deflecting means is adjustable.

* * * * *